E. L. CARAWAY.
AUTOMOBILE LICENSE TAG.
APPLICATION FILED NOV. 16, 1921.
1,410,992.
Patented Mar. 28, 1922.
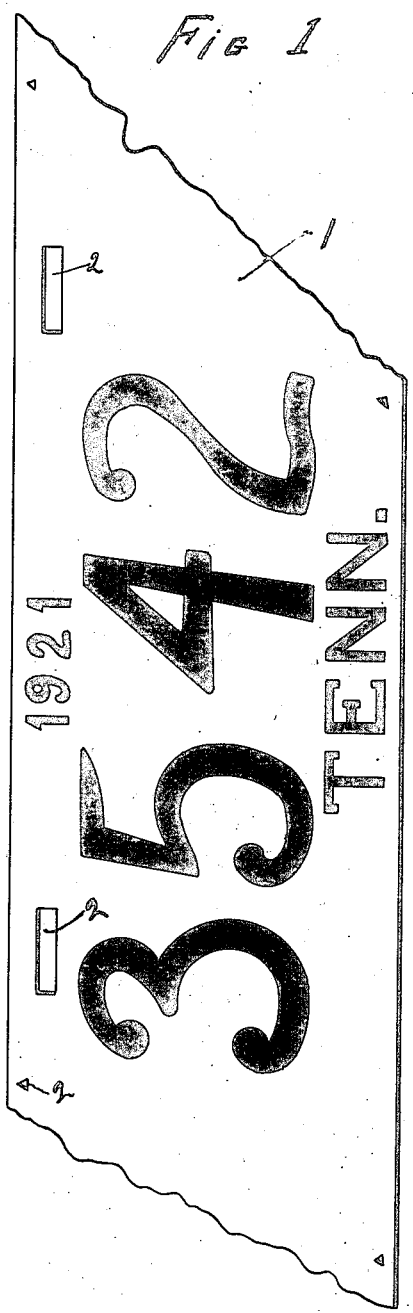
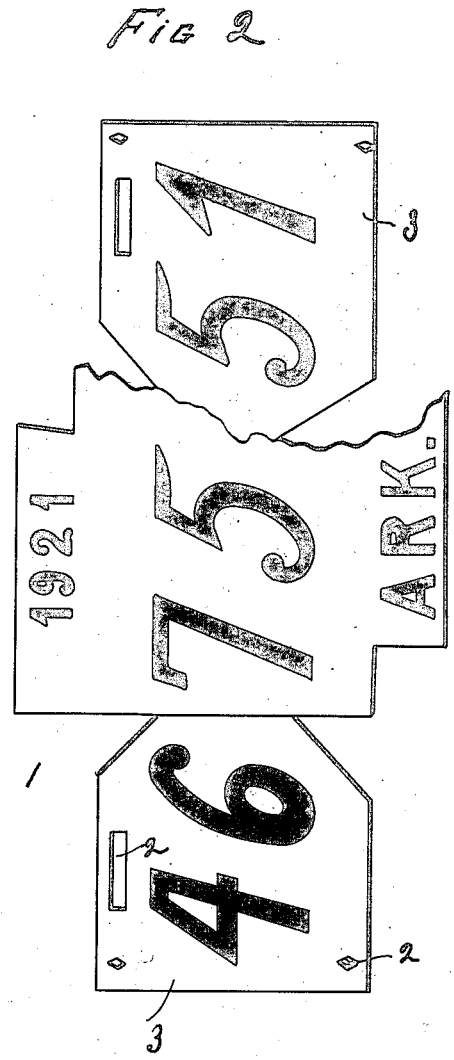
Inventor
E. L. Caraway

UNITED STATES PATENT OFFICE.

EMMETT LYCURGUS CARAWAY, OF MANILA, ARKANSAS.

AUTOMOBILE LICENSE TAG.

1,410,992. Specification of Letters Patent. Patented Mar. 28, 1922.

Application filed November 16, 1921. Serial No. 515,457.

*To all whom it may concern:*

Be it known that I, EMMETT LYCURGUS CARAWAY, a citizen of the United States, residing at Manila, in the county of Mississippi and State of Arkansas, have invented certain new and useful Improvements in Automobile License Tags, of which the following is a specification.

My invention relates to automobile license tags, the particular object being the provision of a novel form of tag which is characteristic, striking, distinctively individual to the various States in which said tags are issued, and in which utility is combined with ornamentation.

A further object of the invention is the provision of such tags, which will indicate from their configuration, the State registry of the vehicle bearing same.

With these and such other objects in view as will be apparent from the description, my invention resides in the novel construction, combination, and arrangement of parts hereinafter described and claimed, and illustrated in the accompanying drawings, of which:

Fig. 1, is an elevation of a form of tag employed, and

Fig. 2, an elevation of another form.

The present invention contemplates the use of license tags 1, cut, stamped, or otherwise formed in the shape of the map outline of the States which the tags represent. It is of course important that the tags have some uniformity in size, in order to permit of ready application. In some instances the outlined area of the State, as illustrated in Fig. 1, by Tennessee, is of sufficient dimensions to permit of forming the apertures 2, for reception of the holding means, within the outlined area.

In the case of smaller and more irregularly shaped outlines, such as illustrated by Arkansas in Fig. 2, I provide wings 3 for the reception of the apertures 2. These wings are integral with the body of the tag, the central portion of which, or that portion representing the map outline, being preferably of a distinctive coloring from the wings.

The serial numbers and various indicia, are suitably arranged on the tags in any desired manner, such arrangement being arbitrary. While I have shown and described certain forms which the invention may take, and illustrated certain details which enter into the construction and operation of the invention, I desire it to be understood that I do not intend to limit myself to these, but that any such may be used as will fall within the scope of the invention as claimed.

I claim:—

1. A vehicle marker formed in the map outline of a jurisdiction in which said marker is issued.

2. A vehicle marker having a portion thereof formed in the map outline of a jurisdiction in which said marker is issued.

3. Registry indicating means for vehicles, comprising a license plate having distinctively formed thereon the map contour of the issuing jurisdiction.

4. An automobile license tag formed in the map shape of the State in which said tag is issued.

5. An automobile license tag having an area of its surface distinctively indicative of the map shape of the State in which said tag is issued.

In testimony whereof I affix my signature.

EMMETT LYCURGUS CARAWAY.